US012624263B2

(12) United States Patent     (10) Patent No.: US 12,624,263 B2
Brandt et al.     (45) Date of Patent: May 12, 2026

(54) DIMENSIONALLY STABLE, WIPE-ON, MODIFIED-POLYETHER-POLYURETHANE-BASED ADHESIVE COMPOUND

(71) Applicant: Henkel AG & Co., KGaA, Dusseldorf (DE)

(72) Inventors: Adrian Brandt, Essen (DE); Horst Beck, Neuss (DE); Alexander Kux, Monheim (DE); Kerstin Schroeder, Grevenbroich/Wevelinghoven (DE); Christoph Lohr, Mettmann (DE); Andrea Brenger, Dusseldorf (DE); Nils Hellwig, Krefeld (DE); Mathias Schriefers, Monchengladbach (DE); Anna Kaulisch, Langenfeld (DE); Jennifer Schmidt, Langenfeld (DE)

(73) Assignee: HENKEL AG & CO. KGaA, Duesseldorf (DE)

( * ) Notice: Subject to any disclaimer, the term of this patent is extended or adjusted under 35 U.S.C. 154(b) by 681 days.

(21) Appl. No.: 17/806,752

(22) Filed: Jun. 14, 2022

(65) Prior Publication Data

US 2022/0306918 A1     Sep. 29, 2022

Related U.S. Application Data

(63) Continuation of application No. PCT/EP2020/084841, filed on Dec. 7, 2020.

(30) Foreign Application Priority Data

Dec. 16, 2019    (EP) ..................................... 19216371

(51) Int. Cl.
    *C09J 175/06*     (2006.01)
    *C08K 3/013*     (2018.01)
    *C09J 7/38*     (2018.01)
    *C09J 11/04*     (2006.01)

(52) U.S. Cl.
    CPC ............. *C09J 175/06* (2013.01); *C08K 3/013* (2018.01); *C09J 7/38* (2018.01); *C09J 11/04* (2013.01); *C09J 2203/358* (2020.08)

(58) Field of Classification Search
CPC ... C09J 175/06; C09J 7/38; C09J 11/04; C09J 2203/358; C08K 3/013
See application file for complete search history.

(56) References Cited

U.S. PATENT DOCUMENTS

| | | | |
|---|---|---|---|
| 5,371,131 A | 12/1994 | Gierenz et al. | |
| 6,093,270 A * | 7/2000 | Ferencz ................. | C09J 167/02 523/513 |
| 6,316,573 B1 | 11/2001 | Klauck et al. | |
| 6,417,261 B1 | 7/2002 | Maier et al. | |
| 2004/0079482 A1 | 4/2004 | Zhang et al. | |
| 2017/0275512 A1 | 9/2017 | Bennour et al. | |
| 2018/0105722 A1* | 4/2018 | Tillack ............... | C08G 18/6254 |

FOREIGN PATENT DOCUMENTS

| | | |
|---|---|---|
| CN | 1185170 A | 6/1998 |
| CN | 101220252 A | 7/2008 |
| CN | 102942674 A | 2/2013 |
| WO | 9626249 A1 | 8/1996 |
| WO | 9637566 A1 | 11/1996 |
| WO | 2019104317 A1 | 5/2019 |

OTHER PUBLICATIONS

Chemistry and Technology of Surfactants, Chapter 5 (Year: 2006).*

* cited by examiner

*Primary Examiner* — Heidi R Kelley
*Assistant Examiner* — Adam J Berro
(74) *Attorney, Agent, or Firm* — Sun Hee Thomas

(57) ABSTRACT

The present invention relates to a dimensionally stable adhesive compound which is formulated so as to be largely water- and solvent-free and can be brought into contact with the substrate to be bonded by being wiped on in the form of a thin adhesive film that is suitable in particular for bonding materials obtained from plant fibers. The organic constituent of the adhesive compound according to the invention consists predominantly of a mixture of polyether polyurethanes which are end-capped with at least two monohydric aliphatic alcohols of different chain lengths. The invention also relates to a method for applying a tacky film to a planar substrate, preferably to paper, by wiping the adhesive compound onto the point of contact with the substrate.

20 Claims, No Drawings

DIMENSIONALLY STABLE, WIPE-ON, MODIFIED-POLYETHER-POLYURETHANE-BASED ADHESIVE COMPOUND

The present invention relates to a dimensionally stable adhesive compound which is formulated so as to be largely water- and solvent-free and can be brought into contact with the substrate to be bonded by being wiped on in the form of a thin adhesive film that is suitable in particular for bonding materials obtained from plant fibers. The organic constituent of the adhesive compound according to the invention consists predominantly of a mixture of polyether polyurethanes which are end-capped with at least two monohydric aliphatic alcohols of different chain lengths. The invention also relates to a method for applying a tacky film to a planar substrate, preferably to paper, by wiping the adhesive compound onto the point of contact with the substrate.

Dimensionally stable adhesive compounds, which are used in such a way that a thin film of the adhesive compound is transferred to the substrate by being wiped onto the point of contact, are known in the prior art and have long been implemented, for example in glue sticks for bonding paper. WO 99/51699 A1 describes glue sticks that can be smoothly wiped on but are dimensionally stable, consisting of an aqueous preparation of starch ethers and sucrose as the adhesive component and a soap gel as the shaping builder substance and, if desired, further auxiliaries. After a thin film has been wiped on, such adhesive compounds set solely through the loss of water and thus in a purely physical manner. In order to ensure the applicability of such an adhesive compound over a longer period of time, it is necessary to prevent the adhesive compound from drying out, which is made possible by the selection of a suitable, largely water-vapor-impermeable packaging means. The packaging means is often at the same time an applicator which, as a rigid structure into which the adhesive compound is filled, is also dimensionally stabilizing, so that there is also greater latitude in the formulation of the dimensionally stable adhesive compound. DE 10047069 A1 describes such an applicator for a water-based, dimensionally stable glue stick.

In contrast, water-free, dimensionally stable adhesive compounds are also known which are likewise formulated to be able to be wiped on. WO 96/37566 A1 describes semi-crystalline, dimensionally stable adhesive compounds based on polyether polyurethanes of which the semi-crystalline structure is broken up by the heat released with friction on a substrate surface, such that a thin adhesive film can be applied which, after a short time, forms semi-crystalline regions again and in this way sets and is able to bond the substrate. In said document, various additives which modify the crystallinity or increase tackiness or which are pigments, fillers, plasticizers, dyes, antioxidants and preservatives are added to such adhesive compounds to improve the property profile. In principle, the adhesive compounds disclosed in the WO publication are already suitable for being placed on the market largely without packaging and for being applied manually to substrates, in particular paper, without a special applicator.

Such a largely water- and solvent-free, dimensionally stable adhesive compound must, however, satisfy a complex requirement profile that includes application-specific, consumer-specific and environmental hygiene aspects. For this purpose, the property profile of dimensionally stable adhesive compounds which can be activated by friction must be further improved in order to be able to establish packaging-free sales units in the consumer market. In this context, it is important to find formulations that can be easily wiped on in the form of a tacky film on flat substrates, have sufficient initial tackiness that flat substrates can be fixed in their relative position with respect to one another via the adhesive film, and set in a short time in a precisely positioned manner and in the process form a cohesive bond that is as long-lasting as possible. Ideally, the adhesive compound is suitable for bonding materials obtained from plant fibers. This property profile is also intended to be retained even after the adhesive compound is stored in a way that is customary in trade and typical for use.

On the part of the consumer, it is also expected that a dimensionally stable adhesive compound which can be wiped onto the substrate directly by hand without an applicator has no tackiness, that the skin is not soiled with adhesive compound and that skin compatibility is ensured. It is also expected by the consumer that such an adhesive compound, in the form of a stick, can be guided over the substrate like a wax crayon when in use, and a continuous adhesive film can be applied in the process. Wiping the adhesive compound on a flat substrate must be possible with little effort, so that flexible thin substrates such as paper are not warped or torn when the adhesive is applied.

Overall, the present invention thus addresses the problem of providing a dimensionally stable, wipe-on adhesive compound which can be formulated so as to be water- and solvent-free and skin-friendly and yet can be easily applied without a separate applicator and for this purpose in particular has a low wiping resistance, with it being intended that the adhesive compound is not permanently tacky at 30° C. and is ideally also translucent. Temperature stability of up to 70° C. is also required for storage and transport. Above all, the adhesive compound is intended to have a high adhesive strength for materials obtained from plant fibers, in particular paper and cardboard. In addition, an adhesive film wiped on by the adhesive compound is intended to generate sufficient initial adhesion that the user does not have to press the substrates to be bonded until they set in order to achieve adequate bonding.

This range of problems is surprisingly solved by formulating an adhesive compound of which the organic constituent consists predominantly of a mixture of polyether polyurethanes which are end-capped with two different monohydric aliphatic alcohols of different chain lengths.

The present invention accordingly relates to a dimensionally stable adhesive compound of which the organic constituent consists predominantly of a mixture of polyether polyurethanes which are end-capped with two different monohydric aliphatic alcohols, one of the at least two different monohydric aliphatic alcohols being selected from those having at least 4 but not more than 8 carbon atoms and the other of the at least two different monohydric aliphatic alcohols being selected from those having at least 16 but fewer than 22 carbon atoms.

The organic constituent of the adhesive compound according to the invention particularly preferably consists predominantly of a mixture of polyether polyurethanes, each of which is end-capped with the two different monohydric aliphatic alcohols mentioned above.

In connection with the adhesive compound according to the invention, an organic compound or a constituent of an organic compound is considered to be aliphatic if said organic compound or the constituent is, aside from oxygen atoms, composed exclusively of carbon and hydrogen atoms.

According to the invention, the mixture of polyether polyurethanes, which is the essential constituent of the adhesive compound, is end-capped with primary monohydric aliphatic alcohols, which in turn are preferably linear, that is to say have neither tertiary nor quaternary carbon atoms. A carbon atom is quaternary when it is covalently bonded to four further carbon atoms, while a tertiary carbon atom is covalently bonded to three other carbon atoms.

According to the invention, polyether polyurethanes are addition products of polyfunctional isocyanates with polyether polyols, the molar ratio of isocyanate groups to hydroxyl groups of the polyether polyols being greater than 1.0, preferably greater than 2.0, particularly preferably greater than 2.5, but preferably less than 4.0, particularly preferably less than 3.5, and the addition product is end-capped and thus has no free isocyanate groups. Within the meaning of the present invention, a polyether polyurethane does not contain any free isocyanate groups if less than 0.1% NCO, based on the total amount of polyether polyurethanes, is contained. To determine the amount of free isocyanate groups, 4 milliliters of a 0.5 M dibutylamine solution in xylene are added to 1 gram of the polyether polyurethane and then mixed with 50 milliliters of xylene and stirred at a temperature of 20° C. until completely homogenized. After adding 3 drops of bromophenol blue and 50 milliliters of isopropanol, titration was carried out with 0.5 M hydrochloric acid until the color changed from blue to yellow. The difference in the consumption of hydrochloric acid for titration of a blank value solution, i.e., without the addition of the polyether polyurethane, multiplied by the value 2.1 and divided by the exact weight of the polyether polyurethane gives the percentage by weight of isocyanate groups.

In an embodiment preferred for increasing the semi-crystalline organic constituents of the adhesive compound, the polyether polyols which form the basis of the polyether polyurethanes are selected from those of which the ether functions are bridged with one another via aliphatic divalent groups, which in turn are preferably linear and unbranched, i.e., have neither tertiary nor quaternary carbon atoms, the divalent groups in turn preferably having at least 4 carbon atoms but preferably not more than 8 carbon atoms, particularly preferably not more than 6 carbon atoms, in the main chain, and very particularly preferably having 4 carbon atoms in the main chain. Adhesive compounds of this type are distinguished by very good temperature stability together with good wiping properties.

It is also preferred for the polyether polyols which form the basis of the mixture of polyether polyurethanes of the adhesive compound according to the invention to have a hydroxyl number of less than 200 mg KOH/g, particularly preferably less than 120 mg KOH/g, but preferably at least 30 mg KOH/g, particularly preferably at least 40 mg KOH/g, in each case based on the entirety of the polyether polyols which form the basis for the mixture of the polyether polyurethanes.

The hydroxyl number is a measure for the number of free hydroxyl groups in the relevant defined reference amount, for example per gram of the polyether polyols which form the mixture of the polyether polyurethanes, and can be experimentally determined by means of potentiometric titration. For this purpose, a weighed sample of the reference amount is heated in a reaction solution of 0.1 mol/l phthalic anhydride in pyridine at 130° C. for 45 minutes, and is mixed with 1.5 times the volume of the reaction solution of pyridine, and is then mixed with 1.5 times the volume of the reaction solution of deionized water ($\kappa$<1 µScm−1). The released amount of phthalic acid is titrated in this mixture by means of 1 M sodium hydroxide solution. The potentiometric measuring is carried out using a combination electrode (LL-Solvotrode® from Metrohm; reference electrolyte: 0.4 mol/l tetraethylammonium bromide in ethylene glycol). The hydroxyl number in this case corresponds to the added amount of NaOH per gram of the reference amount at the inflection point of the potentiometric titration curve.

To set optimum temperature stability together with good wiping properties when applying an adhesive film to paper, it is preferred if the molar ratio of the two different monohydric aliphatic alcohols with respect to one another, defined as the molar amount of aliphatic alcohols having at least 4 but not more than 8 carbon atoms to the molar amount of aliphatic alcohols having at least 16 but fewer than 22 carbon atoms, is in the range of from 1:2 to 3:1, particularly preferably in the range of from 1:1 to 5:2.

According to the invention, the mixture of polyether polyurethanes is preferably obtained by adding at least trifunctional, particularly preferably aliphatic, isocyanates, which are very particularly preferably selected from trimers of hexamethylene diisocyanate and/or pentamethylene diisocyanate, to polyether polyols. As already explained, the free isocyanate groups formed in the addition reaction are reacted with the two monohydric aliphatic alcohols (hereinafter "end-capping"), one of the two monohydric aliphatic alcohols being selected from those having at least 4 but not more than 8 carbon atoms and the other of the two monohydric aliphatic alcohols being selected from those having at least 16 but fewer than 22 carbon atoms.

Polyether polyurethanes having a dynamic Brookfield viscosity (spindle 27) at 80° C. of at least 2,000 mPas, particularly preferably at least 3,000 mPas, more particularly preferably at least 5,000 mPas, but preferably less than 140,000 mPas, particularly preferably less than 60,000 mPas, are also preferably used. Polyether polyurethanes having a dynamic viscosity in the lower preferred range are usually achieved by the end-capping being carried out predominantly with a long-chain monohydric aliphatic alcohol having a higher number of carbon atoms, or by an addition of divalent isocyanates to the semi-crystalline polyether polyols being carried out at least in part.

The mixture of polyether polyurethanes in the adhesive compound according to the invention preferably has a number-average molar mass of less than 6,000 g/mol, particularly preferably less than 5,000 g/mol, but preferably at least 1,000 g/mol, particularly preferably at least 2,000 g/mol, the polydispersity preferably being greater than 4.0, but preferably less than 20.0, particularly preferably less than 15.0. In this molar mass range and with the preferred polydispersity, polyether polyurethanes can be obtained which allow the adhesive compounds according to the invention, which consist of more than 40 wt. % of such polyether polyurethanes, to be wiped on easily and to give said compounds good tackiness together with sufficient temperature stability. The number-average molar mass can be determined using a sample of the reaction mixture, by gel permeation chromatography after calibration against polystyrene standards. For this purpose, at a column oven temperature of 40° C., chromatography is carried out by elution with tetrahydrofuran, with the distribution curve being recorded by means of a concentration-dependent RI detector which continuously determines the refractive index in the eluate at a temperature of likewise 40° C.

For the purposes of the present invention, it is preferred if the polyether polyurethane constituent of the adhesive compound consists predominantly of the above-described mixture of polyether polyurethanes. Correspondingly, adhesive compounds according to the invention are preferred in which the proportion of the mixture of polyether polyurethanes which are end-capped with the two different monohydric aliphatic alcohols, based on the entirety of polyether polyurethanes, is at least 80 wt. %, preferably at least 90 wt. %, particularly preferably at least 95 wt. %.

The organic constituent of the adhesive compound according to the invention then consists predominantly of the mixture of polyether polyurethanes if their proportion is greater than 40 wt. %, based on the organic constituent of the adhesive compound. The adhesive compounds usually exhibit particularly good temperature stability together with good wiping behavior when the proportion of polyether polyurethanes, as described above, based on the organic constituent of the adhesive compound, is greater than 50 wt. %, preferably greater than 70 wt. % or even more preferably greater than 80 wt. %, so that such adhesive compounds are preferred according to the invention. Higher proportions of polyether polyurethanes in the mixture are also advantageous in particular for the translucency of the adhesive compound according to the invention, which consumers find particularly attractive.

Due to the excellent wiping behavior, together with temperature stability and good setting behavior, imparted to the adhesive compound according to the invention via the mixture of the polyether polyurethanes, extensive addition of additives can be largely dispensed with. Nevertheless, the temperature stability can be increased further and the wiping behavior can be further improved without having to accept significant losses in terms of the initial tackiness of the wiped-on film. For this purpose, polyether polyurethanes can be treated with additives, at least some of which polyether polyurethanes are preferably based on semi-crystalline polyester polyols, which in turn can be obtained by polycondensation of a reaction mixture comprising one or more dicarboxylic acids selected from terminal dicarboxylic acids that are both saturated linear and aliphatic and have an even number of at least 8 methylene groups (hereinafter "component A"), and one or more diols selected from terminal diols that are both saturated linear and aliphatic and contain at least one ether function (hereinafter "component B").

In connection with semi-crystalline polyester polyols, a dicarboxylic acid or a diol is considered to be aliphatic if, aside from oxygen atoms, it is composed exclusively of carbon and hydrogen atoms, the term "dicarboxylic acid" also including the corresponding single or double methyl and/or ethyl esters as well as the corresponding single or double acid chlorides. In this context, it also applies that, in the case of a terminal dicarboxylic acid or a terminal diol, the two carboxyl and hydroxyl groups, respectively, are at the end.

The polyether polyurethanes optionally contained according to the invention based on semi-crystalline polyester polyols have crystalline phases below their ring-and-ball softening point, measured in accordance with DIN EN 1238:2011, which phases can be detected by differential scanning calorimetry (DSC) at a heating rate of not more than 10 Kelvin per minute as an endothermic melting peak before the softening point is reached.

In a particular embodiment, polyether polyurethanes are incorporated which are based on semi-crystalline polyester polyols that recrystallize on melting and that can be obtained by polycondensation of a reaction mixture comprising one or more dicarboxylic acids and one or more diols, a) at least 50 mol. %, preferably at least 60 mol. %, particularly preferably at least 70 mol. %, of the dicarboxylic acids are selected from terminal dicarboxylic acids having an even number of at least 8 methylene groups that are both saturated linear and aliphatic (hereinafter "component A"); and
    b) at least 40 mol. %, preferably at least 60 mol. %, particularly preferably at least 70 mol. %, of the diols are selected from terminal diols that are both saturated linear and aliphatic and have at least one ether function (hereinafter "component B").

Such semi-crystalline polyester polyols which recrystallize during melting are distinguished by the fact that exothermic recrystallization occurs during the endothermic melting process before the softening point is reached, i.e., before the transition to the liquid phase, so that an exothermic crystallization peak superimposed on the endothermic melting peak can also be detected by differential scanning calorimetry (DSC) at a heating rate of not more than 10 Kelvin per minute before the softening point is reached. Corresponding semi-crystalline polyester polyols that recrystallize on melting are described in detail in WO 2019/011529 A1. In the context of the present invention, the polyether polyurethanes produced on the basis of these semi-crystalline polyester polyols which recrystallize on melting, as a constituent of the adhesive compound according to the invention, impart improved wiping behavior together with high temperature stability and initial adhesion.

The preferred representatives of dicarboxylic acids according to component A are therefore 1,10-decamethylenedicarboxylic acid, 1,12-dodecamethylenedicarboxylic acid, 1,14-tetradecamethylenedicarboxylic acid and 1,16-hexadecamethylenedicarboxylic acid.

To improve the tackiness of the adhesive compound, it can be advantageous if those polyether polyurethanes are additionally contained which are based on polyester polyols which are obtained from the polycondensation of aromatic dicarboxylic acids or unsaturated dicarboxylic acids having fewer than 9 carbon atoms with aliphatic diols, which preferably have at least one ether function, but have neither a tertiary nor a quaternary carbon atom. Isophthalic acid, terephthalic acid, orthophthalic acid, and furandicarboxylic acid, in particular 2,5-furandicarboxylic acid, can be mentioned in particular as aromatic dicarboxylic acids, and itaconic acid, fumaric acid and/or maleic acid, which can also be contained in the adhesive compound as a polyester polyol constituent of the polyether polyurethanes, can be mentioned as unsaturated dicarboxylic acids having fewer than 9 carbon atoms.

Semi-crystalline polyester polyols which have an acid number preferably less than 50 mg KOH/g, particularly preferably less than 10 mg KOH/g, more particularly preferably less than 5 mg KOH/g and very particularly preferably less than 2 mg KOH/g, in each case per gram of the reaction mixture comprising components A and B and which can be obtained from a reaction mixture of components A and B, the diols being contained in molar excess based on the dicarboxylic acids, but not above a molar excess of 1.2:1, have, as starting materials for the polyether polyurethanes described above, proven to be ideal in terms of recrystallization behavior of the polyether polyurethanes optionally contained in the adhesive compound according to the invention.

The acid number is, according to the invention, an experimentally determinable measured variable which is a measure for the number of free acid groups in the relevant defined reference amount, for example per gram of the reaction mixture. The acid number is determined by dissolving a weighed sample of the reference amount in a solvent mixture of methanol and distilled water in a volume ratio of 3:1, and then potentiometrically titrating said sample with 0.05 mol/l KOH in methanol. The potentiometric measuring is carried out using a combination electrode (LL-Solvotrode® from Metrohm; reference electrolyte: 0.4 mol/l tetraethylammonium bromide in ethylene glycol). The acid number in this case corresponds to the added amount of KOH per gram of the reference amount at the inflection point of the potentiometric titration curve.

For the provision of the polyether polyurethanes optionally contained in the adhesive compound according to the invention via the addition of mono- or polyfunctional iso- cyanates to such semi-crystalline polyester polyols, it is preferred if the hydroxyl number of the polyester polyols is at least 30 mg/g KOH, particularly preferably at least 60 mg/g KOH, more particularly preferably at least 80 mg/g KOH, but preferably has a hydroxyl number below 200 mg/g KOH, particularly preferably below 140 mg/g KOH, more particularly preferably below 120 mg/g KOH, in each case per gram of the reaction mixture comprising compo- nents A and B.

The polyether polyurethanes of the adhesive compound according to the invention optionally contained in an adhe- sive compound according to the invention are addition products of monofunctional or polyfunctional isocyanates with polyester polyols, the addition product being end- capped and thus not having any free isocyanate groups. It is preferred according to the invention if the addition is carried out in such a way that the molar ratio of isocyanate groups to hydroxyl groups of the polyester polyol is greater than 2, preferably greater than 2.5, but preferably less than 4, particularly preferably less than 3.5. The end-capping is preferably carried out with monohydric alcohols. Within the meaning of the present invention, a polyether polyurethane does not contain any free isocyanate groups if it contains less than 0.1 wt. % of NCO, based on the total amount of polyether polyurethanes. To determine the proportion of free isocyanate groups, 4 milliliters of a 0.5 M dibutylamine solution in xylene are added to approx. 1 gram of the polyether polyurethane and then mixed with 50 milliliters of xylene and stirred at a temperature of 20° C. until com- pletely homogenized. After adding 3 drops of bromophenol blue and 50 milliliters of isopropanol, titration is carried out with 0.5 M hydrochloric acid until the color changed from blue to yellow. The difference in the consumption of hydro- chloric acid for titration of a blank value solution, i.e., without the addition of the polyether polyurethane, multi- plied by the value 2.1 and divided by the exact weight of the polyether polyurethane gives the percentage by weight of isocyanate groups.

According to the invention, the polyether polyurethanes are preferably obtained by adding at least trifunctional, particularly preferably aliphatic, isocyanates, which are very particularly preferably selected from trimers of hexameth- ylene diisocyanate and/or pentamethylene diisocyanate, to polyester polyols, preferably to semi-crystalline polyester polyols, with free isocyanate groups formed in the addition reaction preferably being reacted with at least one monohy- dric alcohol, particularly preferably with at least one ali- phatic alcohol, more particularly preferably with at least one linear aliphatic alcohol, each of which preferably has not more than 24 carbon atoms in the main chain, but preferably has at least 4 carbon atoms in the main chain.

The proportion of polyether polyurethanes based on the organic constituent of the adhesive compound in a preferred adhesive compound according to the invention is not more than 50 wt. %, particularly preferably not more than 30 wt. %, more particularly preferably not more than 20 wt. %, very particularly preferably not more than 15 wt. %, but preferably at least 2 wt. %, particularly preferably at least 5 wt. %, in order to optimize the wiping behavior on paper and the temperature stability.

Listed below are further additives and their relevant functionality which can advantageously be added to the adhesive compound according to the invention in order to provide adhesive compounds which meet the specific requirement profiles, as set out further below. One advantage of the adhesive compounds according to the invention is accordingly that it is easy to add additives to the adhesive compound, which consists predominantly of the mixture of polyether polyurethanes.

To increase the initial tackiness of a wipe-on film of the adhesive compound, it can be advantageous, for example, based on the adhesive compound according to the invention, for up to 5 wt. % of tackifiers that are not polyether polyurethanes to be additionally contained. For a significant increase in the initial adhesion, a proportion of at least 1 wt. % of tackifiers, based on the adhesive compound, is pre- ferred. Such tackifiers are organic compounds which pref- erably have a sum of hydroxyl and acid numbers above 100 mg KOH per gram of the relevant organic compound. The tackifiers are preferably resins, preferably, due to their sustainable availability and largely harmless nature with respect to environmental hygiene, natural resins which can be chemically modified. According to the invention, a natu- ral resin according to DIN 55958 comprises excretions secreted by animals and plants. Resins of this type are known to a person skilled in the art, for example as turpen- tine, balsam, gum lacquer, rosin, sandarac or mastic. According to the invention, the natural resins also include the modified natural resins which are obtained from the natural resins, for example by hydrogenation, intrinsic addi- tion reactions or esterification. The natural resins as com- ponent a) of the adhesive compound according to the invention are in turn preferably selected from resin acids and/or resin esters, particularly preferably from resin acids and/or resin esters based on di- and/or triterpenes, which are preferably hydrogenated and/or are present as intrinsic addi- tion products. According to the invention, the term resin ester describes the resin acids which have been modified once or several times via the carboxyl groups of the resin acids in condensation reactions with the formation of ester groups. Preferred representatives of the diterpene-based resin acids and/or resin esters are accordingly abietic acid, neoabietic acid, levopimaric acid, pimaric acid, palustric acid, agathenic acid, illuric acid and podocarpic acid, and the triterpene-based resin acids are elemic acid, sumarresinoleic acid and their mono- or polyesters, having preferably in each case not more than 6 carbon atoms in the alkyl group of the ester group. The use of tackifiers gives the adhesive com- pound, after it has been wiped in the form of a thin film onto a paper surface, increased initial adhesion, which, for example when bonding opposite sides of a paper fold, ensures that the paper surfaces connected by the adhesive film remain connected without exerting a contact pressure until the glue has set.

Small amounts of polyolefin waxes can also have a positive effect on the initial adhesion of the adhesive com- pound due to their largely non-polar character. In addition, the polyolefin waxes bring about better long-term stability of the bond, so that preferably up to 20 wt. %, particularly preferably up to 10 wt. %, in each case based on the adhesive compound, of polyolefin waxes can be contained according to the invention, with a proportion of at least 1 wt. %, in particular at least 2 wt. %, in each case based on the adhesive compound, being preferred for a significant effect. In a preferred embodiment of an adhesive compound according to the invention additionally comprising polyolefin waxes, these are selected from copolymer waxes composed of propylene and ethylene and/or at least one branched or unbranched 1-alkene having 4 to 20 carbon atoms, and can additionally be modified with carboxyl groups for improved compatibility with the adhesive compound, the acid number preferably being below 20 mg KOH per gram of the polyolefin wax. It is also advantageous if the additive-treated polyolefin wax is amorphous and therefore has no crystallinities in the range from 20° C. to the softening point. In addition to the initial adhesion, the polyolefin waxes also increase the elasticity of the adhesive compound, so that, for example, glue sticks based on a correspondingly additive-treated adhesive compound according to the invention can be provided which are less susceptible to breakage, which is particularly advantageous in the case of packaging-free administration and application forms of the adhesive compound according to the invention.

For adhesive compounds according to the invention of which the tackiness is perceived as too unpleasant when the adhesive compound is applied without packaging and an adhesive film is wiped on by hand, the addition of pyrogenic silicic acids up to an amount of 15 wt. %, based on the adhesive compound, can be suitable, while maintaining the other parameters such as initial adhesion, wipeability and setting behavior, for reducing the tackiness of the dimensionally stable administration form, with at least 1 wt. % of the pyrogenic silicic acid preferably needing be treated with additives for a noticeable reduction in tackiness.

In order to improve the wiping of the adhesive compound onto a flat substrate, it can also be advantageous for the adhesive compound to additionally contain up to 5 wt. % of non-ionic surfactants which preferably have an HLB value in the range of from 12-18 and are particularly preferably selected from polyalkoxylated C12-C22 fatty alcohols, very particularly preferably from polyethoxylated C12-C22 fatty alcohols having preferably more than 20 EO units. For a significant improvement in the wiping, a proportion of at least 0.5 wt. % of non-ionic surfactants, based on the adhesive compound, is preferred.

The adhesive compound according to the invention is distinguished in that it can be formulated so as to be solvent-free and water-free, and the bonded connection, due to the setting of the adhesive compound, does not require any physical loss of solvent or water. In a preferred embodiment, the adhesive compound according to the invention therefore contains less than 5 wt. %, preferably less than 1 wt. %, of water, based on the adhesive compound. The proportion of water in the adhesive compound can be determined by the Karl Fischer method in the solvent xylene. Such virtually water-free adhesive-compound formulations according to the invention have the advantage that after an adhesive film has been wiped onto a thin, flat substrate of a water-absorbent material, for example paper, said material does not warp and retains its flat shape even after said adhesive compound has set. In a further preferred embodiment, the adhesive compound according to the invention contains less than 5 wt. %, particularly preferably less than 1 wt. %, based in each case on the adhesive compound, of organic compounds having a boiling point below 100° C. at 1013 mbar.

For the wiping properties and the breakage resistance of the adhesive compound according to the invention, it is generally preferred if the proportion of organic constituents is at least 70 wt. %, preferably at least 80 wt. %, based on the adhesive compound.

In a particularly preferred embodiment, the adhesive compound according to the invention contains:

c) at least 40 wt. %, preferably at least 60 wt. %, particularly preferably at least 80 wt. %, of a mixture of polyether polyurethanes which are end-capped with two different monohydric aliphatic alcohols, one of the two different monohydric aliphatic alcohols being selected from those having at least 4 but not more than 8 carbon atoms and the other of the two different monohydric aliphatic alcohols being selected from those having at least 16 but fewer than 22 carbon atoms;

d) up to 50 wt. %, preferably 5 to 30 wt. %, of polyether polyurethanes;

e) up to 20 wt. %, preferably 1 to 10 wt. %, of polyolefin waxes;

f) up to 5 wt. % of tackifiers; and g) up to 5 wt. % of polyalkoxylated C12-C22 fatty alcohols.

in each case based on the organic constituent, the proportion of the organic constituents not exceeding at least 80 wt. % based on the adhesive compound, and the proportion of inorganic constituents selected from pigments, fillers and salts not exceeding 20 wt. %, preferably 15 wt. %, based on the adhesive compound, and less than 5 wt. %, preferably less than 1 wt. %, based on the adhesive compound, of water being contained.

In connection with this particularly preferred embodiment, the specific configurations of components a) to e) and further additives listed above apply analogously.

According to the invention, the inorganic constituent corresponds to the solids content of the adhesive compound that remains after pyrolysis in a reaction oven with the supply of a 002-free oxygen stream at 900° C. without admixture of catalysts or other additives, with pyrolysis being carried out until an infrared sensor provides a signal identical to the 002-free carrier gas (blank value) in the outlet of the reaction oven. Correspondingly, the organic constituent of the adhesive compound is the adhesive compound minus the amount of water determined by the Karl Fischer method in the solvent xylene and minus the inorganic constituent as defined above.

In the context of the present invention, an adhesive compound is dimensionally stable in principle when a mass of the preparation (10 grams) shaped to form a cylinder and having a base of 2 cm2 deforms irreversibly, when a constantly increasing force acts upon said mass perpendicularly to the base of the cylinder at 30° C. and 50% relative humidity, only above a pressure of 20 N/cm2. The action of the force and the determination of the occurrence of the deformation can be monitored by means of a force measuring device, for example by means of the Texture Analyzer TA-XT HiR (Stable Micro Systems Ltd.). The concept of dimensional stability is closely linked to the required temperature stability of adhesive compounds according to the invention, specifically such that adhesive compounds with a ring-and-ball softening point measured according to DIN EN ISO 4625-1:2006-04 of preferably at least 40° C., particularly preferably of at least 60° C., but preferably of less than 150° C., particularly preferably of less than 100° C., are considered to be temperature-stable to the extent that dimensionally stable adhesive compounds can be provided at 30° C. Ideally, at least 80 wt. % of the organic constituents of the adhesive compound according to the invention have a ring-and-ball softening point, measured according to DIN EN ISO 4625-1:2006-04, of preferably at least 40° C., particularly preferably at least 60° C., in order to provide an adhesive compound that is as dimensionally stable and temperature-stable as possible.

The dimensionally stable adhesive compound provided according to the present invention has low tackiness at 30° C. and can easily be wiped onto substrates. The transfer of material brought about by wiping takes place in such a way that a thin, tacky film of the adhesive compound results on flat substrates, which film sets after a short time so that substrates can be bonded to one another with sufficient adhesion to the adhesive compound.

In a further aspect, the present invention therefore relates to a method for applying a tacky film to a planar substrate, preferably to paper, by pressing a dimensionally stable adhesive compound according to the invention onto the planar substrate and subsequently changing the relative position while maintaining a contact pressure perpendicular to the surface normal of the substrate. Suitable substrates are preferably obtained from plant fibers, are planar and flexible, in particular paper.

PRACTICAL EXAMPLES

In the following, first the preparation of mixtures of polyether polyurethanes is outlined, which as such were cast to form cylindrical, dimensionally stable adhesive compounds according to the invention and characterized with regard to wiping behavior and bonding of paper.

First, 150 g of polytetrahydrofuran (PolyTHF 1000, BASF SE) were weighed into a three-necked flask and stirred for approximately 90 minutes at 80° C. and 30 mbar vacuum. 173.4 g of isocyanate trimer Desmodur® N3300 (Covestro AG) were then added so that an NCO/OH ratio of 3.0 was ensured. The reaction mixture was heated to 80-100° C. and stirred for about 30-45 minutes. Then 53.4 g of n-octanol and 49.7 g of n-hexadecanol (mixture A) or 30.4 g of n-butanol (mixture B) and 49.7 g of n-hexadecanol were added for the end-capping and stirred for 2-3 hours at 80-120° C. before the batch was bottled.

For the purpose of chromatographic characterization by gel permeation chromatography (GPC), a sample of the reaction mixture was dissolved with tetrahydrofuran and applied to the column, and subsequently also eluted with tetrahydrofuran. Gel permeation chromatography (GPC) with an RI detector after calibration by means of polystyrene standards was performed at a column oven temperature of 40° C. and a temperature in the detector of likewise 40° C. The relative number-average and weight-average molar mass values were determined from the molar mass distribution curve and the polydispersity was determined therefrom. Mixture A of the polyether polyurethanes had a number-average molar mass of approx. 3,800 g/mol with a polydispersity of 5.2, whereas for mixture B a polydispersity of 7.0 and a number-average molar mass of approx. 4,250 g/mol were determined.

Mixtures A and B of the polyether polyurethanes were melted at 110° C. and cast in a cylindrical stick shape (diameter 2 cm, length 6-8 cm) and stored for 24 hours at 20° C. before the handling behavior of the stick-shaped adhesive compounds and the property of the wiped-on adhesive film were determined.

The wiping, determined after 10° incision of the cylindrical stick and wiping via the cut surface on paper with a grammage of 80 g/m2 and a contact pressure of 5 N/cm2, was given the value "4" for mixture A and the value "3" for mixture B (scale from 1: stiff, wiping comparable with an eraser, to 5: like Pritt® Original Stick from Henkel AG & Co. KGaA)

The paper tear, determined after bonding a sheet of paper with a grammage of 80 g/m2, which was provided with an adhesive film according to the wiping test and then folded for bonding and pulled apart again after 1 hour at 20° C., was given the value "5" (1: no paper tear, 2: less than 30%, 3: less than 60%, 4: less than 90%, 5: more than 90% of the bond area shows paper tears) for both mixtures.

The softening point of the adhesive compound or of the mixtures A and B of polyether polyurethanes, measured using the ring-and-ball method in accordance with DIN EN ISO 4625-1:2006-04, was 64° C. (mixture A) and 63° C. (mixture B). The adhesive compounds were thus sufficiently temperature-stable to be able to be offered free of packaging.

The invention claimed is:

1. An adhesive compound comprising:
   an organic constituent comprising a mixture of polyether polyurethanes that are based on polyether polyols and that are end-capped with a first monohydric aliphatic alcohol having 4 to 8 carbon atoms and a second monohydric aliphatic alcohol having 16 to 22 carbon atoms, wherein the ratio of isocyanate groups to hydroxyl groups of the polyether polyols is from 2.5:1 to 4.0:1;
   an inorganic constituent; and
   water.

2. The adhesive compound of claim 1, wherein the first monohydric aliphatic alcohol is a linear, primary monohydric aliphatic alcohol, and the second monohydric aliphatic alcohol is a linear, primary monohydric aliphatic alcohol.

3. The adhesive compound of claim 1, wherein the ether functions of the polyether polyols are bridged to one another via aliphatic divalent groups having 4 to 8 carbon atoms in the main chain.

4. The adhesive compound of claim 1, wherein the polyether polyols have a hydroxyl number of from 30 to 200 mg KOH/g, based on the entirety of the polyether polyols.

5. The adhesive compound of claim 1, wherein the molar ratio of the first monohydric aliphatic alcohol to the second monohydric aliphatic alcohol is from 1:2 to 3:1.

6. The adhesive compound of claim 1, wherein the mixture of the polyether polyurethanes is prepared by:
   adding at least one trifunctional isocyanate selected from the group consisting of trimers of hexamethylene diisocyanate and pentamethylene diisocyanate to the polyether polyols; and
   end-capping with the first monohydric aliphatic alcohol and the second monohydric aliphatic alcohol.

7. The adhesive compound of claim 1, wherein the mixture of polyether polyurethanes has a dynamic Brookfield viscosity (spindle 27) at 80° C. from 2,000 to 140,000 mPas.

8. The adhesive compound of claim 1, wherein the mixture of the polyether polyurethanes that are end-capped with the first monohydric aliphatic alcohol and the second monohydric aliphatic alcohol, based on the total weight of polyether polyurethanes, is at least 80 wt. %.

9. The adhesive compound of claim 1, wherein the mixture of polyether polyurethanes that are end-capped with the first monohydric aliphatic alcohol and the second monohydric aliphatic alcohol, based on the total weight of organic constituent of the adhesive compound, is greater than 50 wt. %.

10. The adhesive compound of claim 1, wherein the polyether polyols are semi-crystalline polyester polyols, which are prepared by the polycondensation reaction of:

dicarboxylic acids that are both saturated linear and aliphatic and have an even number of at least 8 methylene groups, and one or more diols selected from terminal diols that are both saturated linear and aliphatic and have at least one ether function.

11. The adhesive compound of claim 10, wherein the mixture of the polyether polyurethanes are prepared by adding at least trifunctional isocyanates to the semi-crystalline polyester polyols, and then end-capping with the first monohydric aliphatic alcohol and the second monohydric aliphatic alcohol.

12. The adhesive compound of claim 1, wherein the organic constituent is present in an amount of at least 70 wt. %, based on the total weight of the adhesive compound.

13. The adhesive compound of claim 1, wherein the water is present in an amount of less than 5 wt. %, based on the total weight of the adhesive compound.

14. The adhesive compound of claim 1, wherein:

A. up to 80 wt. %, based on the total weight of the adhesive compound, of the organic constituent comprises:
  a) at least 40 wt. %, based on the total weight of the organic constituent, of the mixture of the polyether polyurethanes that are end-capped with the first monohydric aliphatic alcohol having 4 to 8 carbon atoms and the second monohydric aliphatic alcohol having 16 to 22 carbon atoms;
  b) up to 50 wt. %, based on the total weight of the organic constituent, of polyester polyurethanes;
  c) up to 20 wt. %, based on the total weight of the organic constituent, of polyolefin waxes;
  d) up to 5 wt. %, based on the total weight of the organic constituent, of tackifiers; and e) up to 5 wt. %, based on the total weight of the organic constituent, of polyalkoxylated C12-C22 fatty alcohols;

B. up to 20 wt. %, based on total weight the adhesive compound, of the inorganic constituent selected from the group consisting of pigments, fillers, salts, and any combination thereof; and C. up to 5 wt. %, based on the total weight of the adhesive compound, of the water.

15. A method for applying a tacky film to a planar paper substrate, the method comprising:

pressing the adhesive compound of claim 1 onto the planar paper substrate; and subsequently changing the relative position of the tacky film while maintaining a contact pressure perpendicular to the surface normal to the planar paper substrate.

16. The adhesive compound of claim 1, wherein the softening point temperature of the adhesive compound is from 60° C. to 150° C.

17. The adhesive compound of claim 1, wherein the ratio of isocyanate groups to hydroxyl groups of the polyether polyols is from 2.5:1 to 3.5:1.

18. The adhesive compound of claim 1, further comprising a non-ionic surfactant.

19. The adhesive compound of claim 1, further comprising a polyalkoxylated C12-C22 fatty alcohol present in an amount of from 0.5 to 5 wt %, based on the total weight of the adhesive compound.

20. The adhesive compound of claim 1, wherein the mixture of polyether polyurethanes has a number-average molar mass of less than 6,000 g/mol.

* * * * *